Apr. 10, 1923.
A. H. NEULAND
POWER TRANSMISSION APPARATUS
Filed May 13, 1916
1,451,465
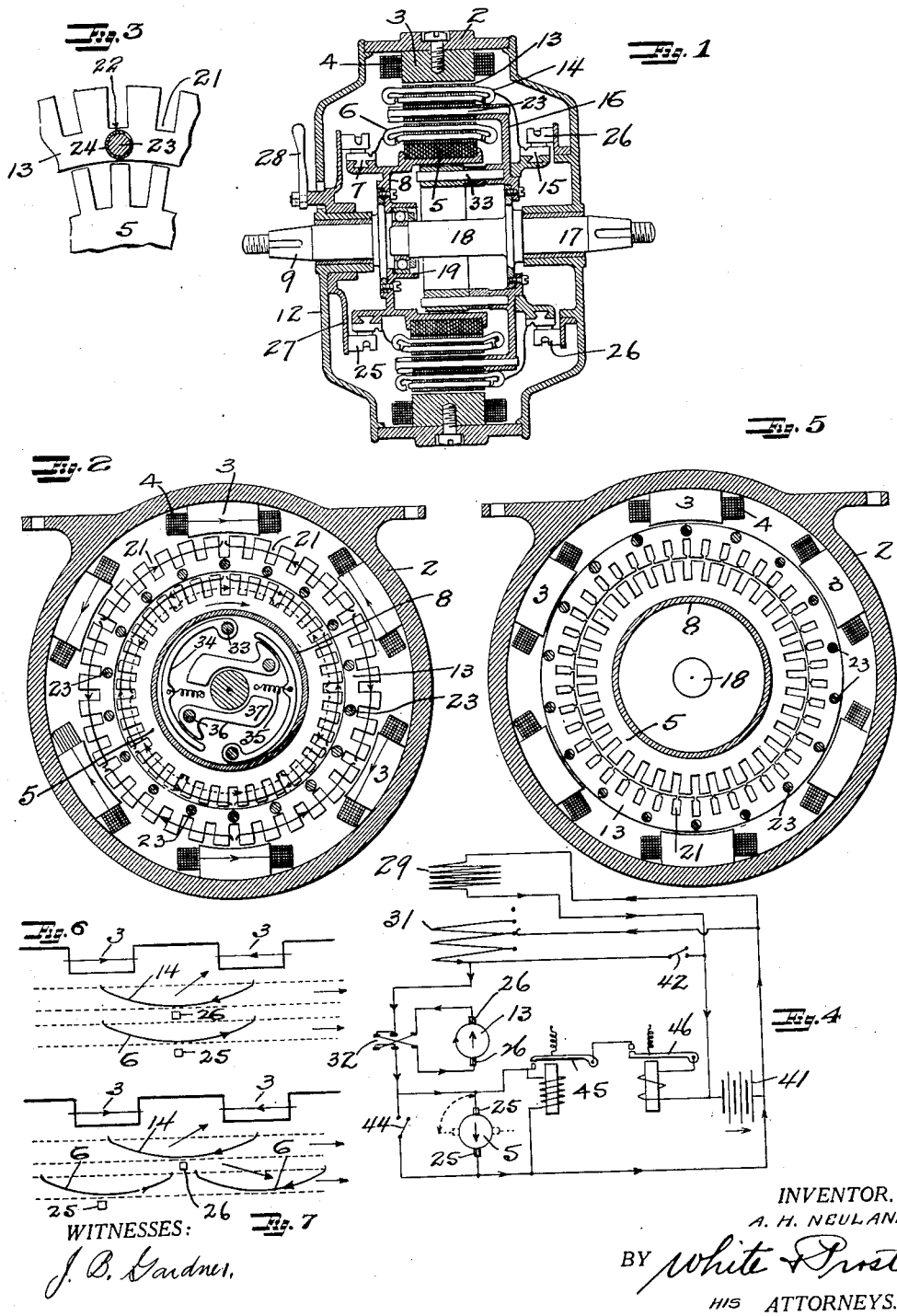
INVENTOR.
A. H. NEULAND.
BY White & Prost.
HIS ATTORNEYS.
WITNESSES:
J. B. Gardner, Patented Apr. 10, 1923.

1,451,465

UNITED STATES PATENT OFFICE.

ALFONS H. NEULAND, OF SAN FRANCISCO, CALIFORNIA, ASSIGNOR TO NEULAND ELECTRICAL COMPANY, INC., OF SAN FRANCISCO, CALIFORNIA, A CORPORATION OF NEW YORK.

POWER-TRANSMISSION APPARATUS.

Application filed May 13, 1916. Serial No. 97,258.

*To all whom it may concern:*

Be it known that I, ALFONS H. NEULAND, a subject of the Czar of Russia, and a resident of the city and county of San Francisco, State of California, have invented a certain new and useful Power-Transmission Apparatus, of which the following is a specification.

The invention relates to electric power transmission apparatus and particularly to such apparatus of the direct current type.

An object of the invention is to provide such an apparatus in which the torque of the driven element may exceed the torque of the driver or prime mover and in which the driven element may be rotated in the same or the opposite direction to the driver and at a speed differing from that of the driver.

Another object of the invention is to provide means for controlling the speed and direction of rotation of the driven element without requiring a change in speed or direction of rotation of the driver.

Another object of the invention is to provide means for causing the load on the driven element to automatically vary the delivered torque with respect to the applied torque of the prime mover.

A further object of the invention is to provide mechanical means for assisting in transferring the full torque from the prime mover to the driven element without slipping when the driven element is rotating at high speeds.

The invention possesses other advantageous features, some of which, with the foregoing, will be set forth at length in the following description where I shall outline in full that form of the invention which I have selected for illustration in the drawings accompanying and forming part of the present specification. In said drawings I have shown one specific form of my generic invention, but it is to be understood that I do not limit myself to such form, because the invention may be embodied in a multiplicity of forms, each constituting a species of my invention.

In said drawings:

Figure 1 is a longitudinal section, partly diagrammatic, of one form of the apparatus of my invention.

Fig. 2 is a cross section, partly diagrammatic, of the apparatus shown in Fig. 1.

Fig. 3 is a detail of the armature construction.

Fig. 4 is a diagrammatic representation of the apparatus and its associated electrical circuits.

Fig. 5 is a cross section of a modified form of the apparatus.

Fig. 6 is a diagrammatic representation of the relation of the currents in the armatures during the operation of the apparatus, with the brushes alined.

Fig. 7 is a diagrammatic representation of the relation of the currents in the armatures when the brushes are in quadrature to each other.

The apparatus of my invention is adapted for use in transferring power from one rotatable element to another, particularly from a prime mover to a driven element, in which it is desirable to vary the speed of the driven element with relation to the speeds of the prime mover. This renders the apparatus particularly adaptable for use in internal combustion engine propelled vehicles for transferring the power from the engine to the driven shaft, but it is to be understood that its use is not confined to such employment. For the purposes of this specification, however, I shall describe its use in an automobile, since several of its functions are particularly advantageous to automobile conditions.

One of the features of the apparatus which render it particularly advantageous in automobile construction is the automatic torque and speed variations between the engine and the rear axle, whereby the effect of changing gear ratios to meet various road resistance conditions is automatically produced by the variation in road resistance. This feature enables the vehicle to climb all ordinary grades without requiring changes in the transmission control thereby centering the vehicle control in the engine control lever only, for all ordinary conditions of running. Other advantageous features of the construction will become apparent as the description proceeds.

The apparatus comprises a stationary field element 2, preferably provided on its inner face with a plurality of pole-pieces 3 which are provided with field coils 4. Arranged within the field element 2 and spaced apart radially therefrom is an armature 5 provided with a winding 6 and a commutator 7 to which the winding is connected. The armature 5 is mounted on the drum 8 which is secured to the shaft 9 which is preferably connected to the engine, thus constituting the armature 5, the driving member. The shaft 9 is journalled in the casing 12 and is otherwise supported as will hereinafter appear. Arranged in the annular space between the armature 5 and the faces of the field poles 3 is a second armature 13, provided with a winding 14 which is connected to the commutator 15. The armature 13 is mounted on the spider 16 which is secured to the shaft 17 which in turn is preferably connected to the mechanism to be driven constituting the armature 13, the driven member. The shaft 17 is suitably journalled in the casing 12 and is provided with an extended portion 18 which is journalled by anti-friction bearings in the hub 19 formed on the drum 8, thereby providing an additional bearing for each shaft.

The inner armature 5 and the stationary field member 2 may be formed in any known or suitable manner, but the intermediate member or armature 13 is so constructed that the major portion of the flux from the field poles will traverse it radially, so that the main magnetic circuit includes the field element and both armatures. To produce this effect, the intermediate armature 13 is provided with series of slots 21, preferably on its outer circumference, in which the winding 14 is lodged, and with a circular series of holes arranged in that portion of the armature lying between the base of the slots and the opposite circumference. These holes are of such size that only a thin bridge 22 of metal remains on the opposite sides of the hole which serve to hold the lamination together, and on account of these holes only a portion of the flux is permitted to traverse the armature circumferentially and the spacing of the holes is such as to allow the bulk of the flux to pass radially through the armature. The laminations which form the armature are preferably held together by bolts 23, preferably of non-magnetic material, passing through the holes and in order to avoid stray currents, the bolts 23 are preferably provided with a fiber bushing 24. The holes are preferably arranged in radial alinement with the base of the slots 21, but this arrangement is not essential and the number of holes is preferably such that a plurality of holes occur in the portion of the armature lying between two adjacent field poles. When running light the thin bridges permit only a small portion of the flux to pass circumferentially of the outer armature, with the result that the bulk of the flux will normally traverse the armature radially, and also traverse the inner armature. When the load on the transmission increases, a powerful field and flux is produced and a considerable portion of this flux will pass through the bridges and holes in the armature 13 and will not pass through the inner armature, thereby automatically varying the torque of one armature with respect to the other, for the reason that if the ampere turns of both armatures are the same, the torque of one armature and the torque reaction of the other are directly proportional to the flux traversing each armature and since the relative flux through the armatures vary with the load, the relative torques of the armatures are accordingly varied.

When the load on and the current in the armatures is light, the flux, set up principally by the shunt winding, is practically unopposed by the small armature reactions and consequently all of the flux, with the exception of that which leaks across the thin bridges, traverses both armatures radially. When the load and the armature currents become heavy, the field flux will be pulled over to the left, as shown in Fig. 6, by the current in winding 14 and will then encounter the opposing force of the current in winding 6 and thus be compelled to pass between the windings, leaving only a small portion traversing the inner armature.

The commutator 7 is provided with normally stationary brushes 25 which are connected to stationary brushes 26 wiping the commutator 15, so that the current generated in the winding of the inner armature 5 is conducted to the windings of the intermediate armature 13. The brushes 25 are arranged on a spider 27 which is rotatable by a handle 28 or other suitable means through an arc of 90 electrical degrees, so that the 180° out of phase relation of the currents in the two armatures can be decreased to become 90° out of phase, thereby still further increasing the available torque over the applied torque. Figure 6 shows the position of the brushes and the relation of the currents in the armatures, when the torque requirements are such that they can be met automatically as heretofore described and shows that the torque on the outer armature is produced solely by the field, the currents in the two armatures being 180° out of phase and producing no pull on each other, while Fig. 7 shows the inner armature brushes shifted so that the two armature currents are 90° out of phase, thereby causing the displaced currents of the inner armature to produce an additional torque on the outer armature. This variation in torque, due to the shifting of the brushes, is usually necessary only in accelerating the vehicle from standstill and for climbing steep grades and other conditions requiring an excessive torque, the automatic torque variation being usually sufficient to meet the various conditions of ordinary running. The brushes 25 are normally in such position that the currents in the two armatures are 180° out of phase, but when a larger torque is required the brushes 25 are shifted against the rotation of the armature 5 so that a torque is directly transferred from one armature to the other.

The field poles 3 are preferably compound wound, being provided with a shunt winding 29 and a series winding 31, and if desired, commutating poles may be provided to insure good commutation, although in most instances, for reasons which will hereinafter appear, the commutating poles will not be required. The series field is variable and the apparatus may be controlled by varying the strength of the field, when the brushes are in the position shown in Fig. 7. In this method of control the torque is strongest and the speed lowest when the full field is in and by varying the field to zero the torque as well as the counter potential field and outer armature is gradually reduced, resulting in an increased speed.

When the brushes of both armatures are set in electrical quadrature with the field poles, and the main electric circuit, consisting of the series field winding 31 and the two armature windings 6 and 14 connected in series, is closed, the current generated in the inner armature winding flows through it and causes the field to produce a torque on the outer armature 13, thus rotating it in the direction of the inner armature, if the connections are such that the currents in the two armatures oppose each other. Thus, with the proper selection of the number of turns of the windings of the two armatures, the speed of the driven member 17 may exceed that of the driving member 9, and the apparatus operates as a generator-motor with a common field and magnetc circuit. Due to the arrangement of the parts, the inner armature current opposes the outer armature current when the two armatures rotate in the same direction, so that each armature current neutralizes the field distortion due to the other, resulting in inherently good commutation. With the above setting, that is, with the two sets of brushes in electrical quadrature with the field practically all of the torque exists between the stationary field poles and each armature, and therefore the available torque at light loads practically equals the torque applied by the prime mover.

In order to reverse the direction of rotation of the driven element 17 with respect to the driver 9, the brushes 25 are shifted so that there is no torque between the inner and outer armature and the brush leads of the outer armature 13 are then reversed by means of a suitable reversing switch 32, whereupon rotation of the outer armature in the reverse direction will be produced. The amount of torque to be applied to the driven element in the reverse direction may be varied by shifting the brushes 25. It is to be noted that the present apparatus is capable of developing a reverse torque substantially equal to the normal forward torque, without the use of reverse gears commonly used for that purpose.

I shall now describe the operation of the automatic torque variation feature of my invention. Assuming the two armatures to have an equal number of turns in series, the speed of the outer driven armature 13, running light or under ordinary load conditions, will substantially equal the speed of the inner driving armature 5, since on account of the construction of the outer armature, substantially all of the field flux will traverse both armatures, the small armature current producing only a negligible reaction or opposition to the flux, so that only a small portion of the flux will pass through the bridges and holes of the outer armature. When the mechanical load on the outer armature is great, a strong current flows through the armatures and the series field produces a powerful field and flux with the result that a large portion of the flux passes through the bridges and across the holes in the outer armature without traversing the inner armature. The strong currents in the armatures act to still further shunt the flux away from the inner armature, so that a much larger flux passes through the windings of the outer armature than through the windings of the inner armature. The ampere turns of both armatures being the same, the torque of one armature and the torque reaction of the other are directly proportional to the flux traversing each armature, and therefore the torque of the driven outer armature exceeds that of the inner armature and automatically increases above the torque of the driver with an increasing load on the driven element. Therefore, the torque of the driven element automatically varies under different load conditions with respect to the torque of driving element, eliminating the necessity of any manual control of the transmission apparatus under ordinary running conditions. When the vehicle being driven encounters a steep grade or other road conditions requiring an increase in torque over that which may be supplied by the prime mover and the automatic torque variation, the torque of the driven member may be still further increased by shifting the brushes 25, to place the armature currents out of phase, as has been heretofore explained.

I have stated that the transmission apparatus of my invention is particularly adapted for use on automobiles and other power propelled vehicles. In the present automobile practice it is customary to select an engine having sufficient power to climb all ordinary grades on high gear so that gear shifting is avoided; to develop sufficient maximum torque on low gear to drive the vehicle over the steepest grades and to develop a sufficient torque on high gear to drive the vehicle at the maximum desired speed. The transmission of this invention as heretofore described is obviously capable of meeting these requirements, but in order that its size and weight may be kept at a minimum and its efficiency at a maximum, I prefer to construct it to meet the first two requirements and to provide additional means for meeting the third requirement. This I accomplish by providing a clutch mechanism which is actuated at a predetermined speed of the driven element, to assist in the transfer of power from the driver to the driven shaft, thereby relieving the electric mechanism of this additional load.

In the drawings, Figs. 1 and 2, I have shown one form of apparatus for accomplishing this result. Arranged within the shell 8 of the inner armature 5 and pivoted on rods 33 which are secured to the spider 16 of the outer armature are clutch shoes 34 which are adapted to engage the inner surface of the shell and which are normally held out of engagement with the shell by the springs 35. Arranged adjacent the free ends of the clutch shoes and pivoted on rods 36 secured to the spider 16 are weighted arms 37 having cam surfaces engaging the shoes 34. Rotation of the spider 16 causes the free ends of the arms 37 to be moved outward by centrifugal force, thereby tending to move the clutch shoes into engagement with the inner armature shell. When the centrifugal force of the arms overcomes the tension of the springs, the clutch shoes are forced into engagement with the armature shell, permitting power to be transmitted mechanically from the driver to the driven element. By this construction, when the vehicle travels at a high speed requiring a great sustaining torque, part of the torque is transferred electrically and part mechanically without slippage of the clutch with the result that the currents in and the temperature rise of the transmission apparatus are kept within reasonable limits. The springs holding the clutch shoes are of such strength that the mechanical clutch is brought into operation only at comparatively high vehicle speeds requiring a strong torque. By providing this means for assisting in transferring the high sustaining torque, the electrical transmission may be made smaller and lighter than would be otherwise necessary, and the overall efficiency thereof is increased.

In Fig. 5 I have shown a modified form of the apparatus in which the slots for the winding 14 of the outer armature 13 are formed on the inner face of the armature instead of on the outer face. This construction will operate the same as the construction shown in Fig. 2, but since the slotted faces of the two armatures are in juxtaposition, it is necessary that the number of slots in the two armatures vary and it is further advisable that the slots on the outer armature be partially closed so that a free radial path for the flux is provided.

In Fig. 4, I have shown diagrammatically the electric circuits of the transmission apparatus and the associated battery 41, which is employed for furnishing current to the apparatus when it is to operate as a starter for the internal combustion engine. By closing the switch 42, the battery is connected in series with the two armatures, the flow of current through the armatures and through the series field causing the rotation of armature 5 which is connected to the engine. As soon as the engine has started, switch 42 is opened. The arrows on the diagram show the direction of the currents when the apparatus is operating to transmit power from the driver to the driven element for a forward direction or movement of the vehicle. The switch 32 serves to reverse the direction of current in the windings of armature 13, causing the vehicle to be propelled in the reverse direction from a position of standstill and operating as a brake when the vehicle is moving forward. A demagnetizing short circuit switch 44 is arranged in a short circuit around the armature 5 and when this switch is closed, the device is quickly demagnetized and uncoupled from the engine.

The battery is also connected across the terminals of the inner armature through an automatic minimum voltage switch 45 and an automatic maximum current switch 46. The minimum voltage switch operates to close the battery charging circuit when the generated voltage reaches the battery voltage, so that the battery is prevented from discharging through the inner armature. The maximum current switch opens the charging circuit when the transmission is called upon to do heavy duty, so that the battery may be of much lower voltage than the transmission apparatus, since it charges only when the load is light and the voltage is consequently low, and is disconnected when the armature current and voltage exceed the battery capacity and voltage. A further advantageous feature of this arrangement is that at heavy loads the battery is out of circuit leaving the full power of the transmission for driving the vehicle.

The shunt field winding is connected across the terminals of the battery and the battery discharges through the winding when the potential of the armature is less than that of the battery in order to prevent the device from becoming demagnetized.

I claim:

1. In an electric power transmission apparatus, a driving armature, a driven armature surrounding said driving armature, a stationary field element surrounding said driven armature arranged to produce a flux traversing both of said armatures and means for varying the flux traversing said driving armature with respect to the flux traversing said driven armature.

2. In an electric power transmission apparatus, a driving element, a driven element in direct inductive relation therewith, and means operative to produce a flux traversing said elements in proportion to the load transmitted, said driven element being provided with means for varying the path of the flux therethrough in proportion to the intensity of the flux whereby variations in load on the driven element automatically vary the torque of the driven element with respect to the torque of the driving element.

3. In an electric power transmission apparatus, a driving element, a driven element in direct inductive relation therewith, means for producing a variable magnetic flux traversing said elements, said driven element being provided with means for varying the proportion of the flux traversing the driving element in proportion to the load on the driven element.

4. In an electric power transmission apparatus, a driving armature, a concentric driven armature contiguous with the driving armature, a field element adapted to produce a flux traversing both armatures, one of said armatures being constructed to vary the amount of flux traversing the other armature inversely in proportion to the intensity of the flux.

5. In an electric power transmission apparatus, a driving armature, a driven armature, a field element adapted to produce a flux traversing both armatures and high reluctance bridges on the driving armature operative to vary the relative fluxes through said armatures in proportion to the load on the driven armature.

6. In an electric power transmission apparatus, a driving armature, a driven armature, a field element adapted to produce a flux traversing both armatures, one of said armatures being constructed to cause varying portions of the flux to be diverted from the other armature with varying loads on the transmission apparatus.

7. In an electric power transmission apparatus, a field element adapted to produce a flux, a driving armature arranged within the field element and a driven armature arranged between the field element and the driving armature whereby the flux passes radially through said armatures, said driven armature being arranged to cause a portion of the flux to pass circumferentially thereof when the load on the driven armature rises above the load on the driving armature.

8. In an electric power transmission apparatus, a driven laminated annular armature provided with a plurality of circumferentially spaced apertures adapted to oppose the passage of a magnetic flux circumferentially, and bolts of non-magnetic material extending through said apertures and holding the laminations together.

9. In an electric power transmission apparatus, a spider, an annular laminated armature mounted on said spider, said armature being provided with a plurality of circumferentially spaced apertures adapted to oppose the passage of a magnetic flux circumferentially of the armature and bolts arranged in said apertures and securing the armature to the spider.

10. In an electric power transmission apparatus, a laminated armature provided with a plurality of circumferentially spaced apertures adapted to oppose the passage of a magnetic flux circumferentially, bolts extending through said apertures and bushings of insulating material surrounding said bolts.

11. In an electric power transmission apparatus, an annular laminated armature provided on one circumferential face with slots to receive the armature winding and provided between the circle of the base of the slots and the other circumferential face with a plurality of circumferentially spaced apertures and means engaging in said apertures for supporting the armature.

12. In an electric power transmission apparatus, a laminated annular driven armature provided on one circumferential face with a plurality of slots adapted to receive the armature winding and provided between the circle of the base of the slots and the other circumferential face with a plurality of circumferentially spaced apertures, a driving armature arranged within said driven armature and a stationary field element surrounding the driven armature.

13. In an electric power transmission apparatus, a driving armature and a driven armature electrically connected in series, a circuit including said armatures and a field winding, a source of current, a shunt field winding connected across said source, and a starting circuit containing said source and shunting the series field winding.

14. An electric power transmission apparatus comprising a driving shaft and a driven shaft, a driving armature secured on the driving shaft and including a winding and a commutator, a driven armature secured on the driven shaft and including a commutator and a winding inductively related to the winding of the driving armature, means including a set of stationary brushes wiping each commutator for connecting the two windings in series, means for shifting the brushes on one commutator to bring the currents in the armature windings in different relation, and a stationary field structure arranged to produce a flux traversing both armatures.

15. An electric power transmission apparatus comprising a driving shaft and a driven shaft, a driving armature secured on the driving shaft and including a winding and a commutator, a driven armature secured on the driven shaft and including a commutator and a winding inductively related to the winding of the driving armature, means including a set of stationary brushes wiping each commutator for connecting the two windings in series, means for angularly shifting the brushes on the commutator of the driving armature, and a stationary field structure including a field winding connected in series with the armature windings and arranged to produce a flux traversing both armatures.

16. An electric power transmission device comprising a driving shaft and a driven shaft, a stationary field structure including field coils, a driving armature secured on the driving shaft and including a commutator and a winding arranged to be cut by the field flux and a core for conducting the flux, and a driven armature secured on the driven shaft and including a commutator and a core and winding thereon disposed between the field coils and driving armature winding in inductive relation to both, the core of the driven armature being provided at spaced points circumferentially with apertures whereby it forms a low reluctance path from field poles to the driving armature but a high reluctance path circumferentially of the driven armature core.

17. An electric power transmission device comprising a driving shaft and a driven shaft, a stationary field structure including field coils, a driving armature secured on the driving shaft and including a commutator and a winding arranged to be cut by the field flux and a core for conducting the flux, a driven armature secured on the driven shaft and including a commutator and a core and winding thereon disposed between the field coils and driving armature winding in inductive relation to both, the core of the driven armature being provided at spaced points circumferentially with apertures whereby it forms a low reluctance path from field poles to the driving armature but a high reluctance path circumferentially of the driven armature core and means including a set of stationary brushes wiping each commutator for connecting the armature windings and field coils in series.

18. An electric power transmission device comprising a driving shaft and a driven shaft, a stationary field structure including field coils, a driving armature secured on the driving shaft and including a commutator and a winding arranged to be cut by the field flux and a core for conducting the flux, a driven armature secured on the driven shaft and including a commutator and a core and winding thereon disposed between the field coils and driving armature winding in inductive relation to both, the core of the driven armature being provided at spaced points circumferentially with apertures whereby it forms a low reluctance path from field poles to the driving armature but a high reluctance path circumferentially of the driven armature core, means including a set of stationary brushes wiping each commutator for connecting the armature windings and field coils in series, and means for angularly shifting the brushes on the commutator of the driving armature.

In testimony whereof, I have hereunto set my hand at San Francisco, California, this 8th day of May, 1916.

ALFONS H. NEULAND.

In presence of—
H. G. PROST.